United States Patent [19]

Windish

[11] 4,420,992
[45] Dec. 20, 1983

[54] PLANETARY TRANSMISSION

[75] Inventor: Willis E. Windish, Pekin, Ill.

[73] Assignee: Caterpillar Tractor Co., Peoria, Ill.

[21] Appl. No.: 288,953

[22] Filed: Jul. 7, 1981

[51] Int. Cl.³ .................. F16H 3/44; F16H 57/10; F16H 37/00
[52] U.S. Cl. .................. 74/781 R; 74/758; 74/760; 74/766; 74/15.63
[58] Field of Search ............ 74/781 R, 761, 760, 74/759, 758, 766, 767, 772, 11, 15.6, 15.63, 15.66, 15.84, 15.8; 192/86

[56] References Cited

U.S. PATENT DOCUMENTS

| 2,221,393 | 11/1940 | Carnegie | 74/262 |
|---|---|---|---|
| 2,510,469 | 6/1950 | Greenlee | 74/781 R |
| 2,516,208 | 7/1950 | Hasbany | 74/781 R |
| 2,896,479 | 7/1959 | Kelbel | 74/781 R |
| 2,933,944 | 4/1960 | Carnagua | 74/781 R |
| 2,978,928 | 4/1961 | Tuck et al. | 74/645 |
| 3,031,901 | 5/1962 | Simpson | 74/759 |
| 3,181,393 | 5/1965 | Jandasek | 74/781 R |
| 3,319,491 | 5/1967 | Simpson | 74/15.66 |
| 3,410,157 | 11/1968 | Livezey | 74/758 |
| 3,483,771 | 12/1969 | Forster et al. | 74/767 |
| 3,863,746 | 2/1975 | Schulz | 192/86 |
| 3,996,817 | 12/1976 | Winzeler | 74/765 |
| 4,019,406 | 4/1977 | Herr | 74/766 |
| 4,090,415 | 5/1978 | Gorrell et al. | 74/769 |
| 4,189,960 | 2/1980 | Holdeman | 74/781 R |
| 4,205,563 | 6/1980 | Gorrell | 74/730 |
| 4,275,608 | 6/1981 | Brancolim | 74/15.63 |

FOREIGN PATENT DOCUMENTS

| 677960 | 6/1939 | Fed. Rep. of Germany | 192/86 |
|---|---|---|---|
| 2439604 | 3/1975 | Fed. Rep. of Germany | 74/759 |
| 55-51150 | 4/1980 | Japan | 74/781 R |
| 995233 | 6/1965 | United Kingdom | 74/760 |

Primary Examiner—Kenneth Dorner
Assistant Examiner—D. Wright
Attorney, Agent, or Firm—Charles E. Lanchantin, Jr.

[57] ABSTRACT

A planetary transmission (10) is disclosed including a front section (48) having a rotating housing (52) and a planetary gear set (18) with a ring gear (62), a sun gear (64) and a planet carrier (66). Advantageously, the ring gear (62) is the input and the rotating housing (52) is the output, and the sun gear (64) is continually held stationary. A first clutch assembly (32) connects the planet carrier (66) to the rotating housing (52) and provides underdrive and a second clutch assembly (34) connects the ring gear to the rotating housing (52) and provides direct drive. The front section (48) is operatively connected to a rear section (50) for multi-speed use especially adaptable to an agricultural vehicle.

18 Claims, 4 Drawing Figures

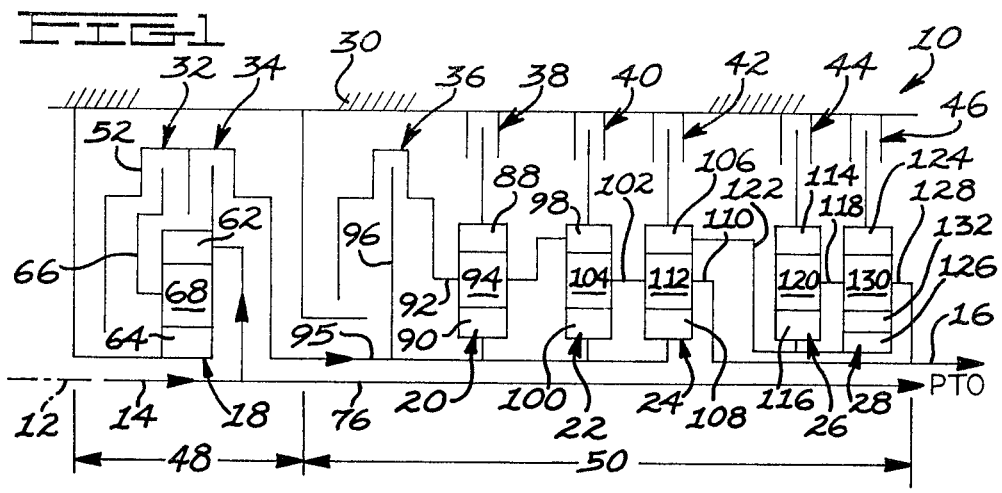
FIG-1
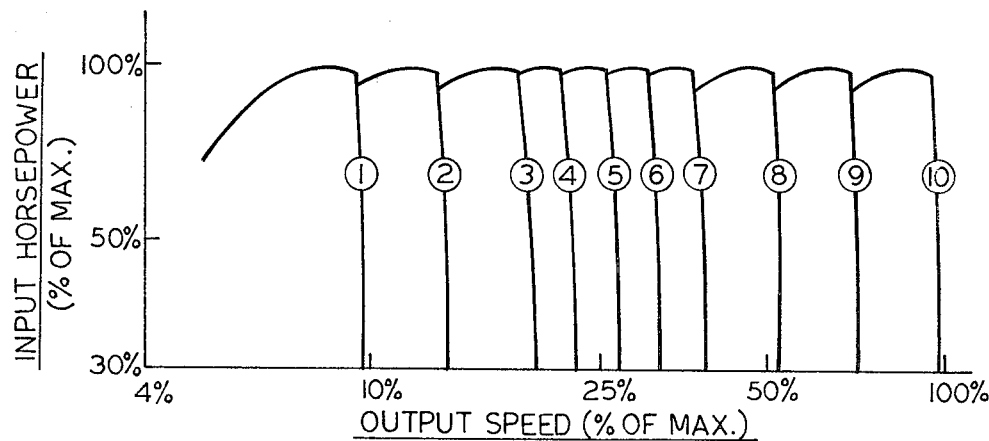
FIG-2
| GEAR | CLUTCHES & BRAKES ENGAGED | | | | | | | | TOTAL REDUCTION | STEP RATIO |
|------|----|----|----|----|----|----|----|----|----------|------|
|      | 32 | 34 | 36 | 38 | 40 | 42 | 44 | 46 |          |      |
| 1    | ●  |    |    |    |    |    |    | ●  | 10.41    | 1.40 |
| 2    |    | ●  |    |    |    |    |    | ●  | 7.46     | 1.43 |
| 3    | ●  |    |    |    |    | ●  |    |    | 5.20     | 1.19 |
| 4    | ●  |    |    |    | ●  |    |    |    | 4.39     | 1.18 |
| 5    |    | ●  |    |    |    | ●  |    |    | 3.73     | 1.19 |
| 6    |    | ●  |    |    | ●  |    |    |    | 3.14     | 1.17 |
| 7    | ●  |    |    | ●  |    |    |    |    | 2.68     | 1.40 |
| 8    |    | ●  |    | ●  |    |    |    |    | 1.92     | 1.38 |
| 9    | ●  |    | ●  |    |    |    |    |    | 1.40     | 1.40 |
| 10   |    | ●  | ●  |    |    |    |    |    | 1.00     |      |
| NEUT.|    |    | ●  |    |    |    |    |    | —        |      |
| R-1  | ●  |    |    |    |    |    | ●  |    | -6.05    |      |
FIG-3

PLANETARY TRANSMISSION

DESCRIPTION

1. Technical Field

This invention relates generally to a planetary transmission, and more particularly to a multi-speed planetary transmission for a vehicle.

2. Background Art

Power shift transmissions are known in the earthmoving and trucking vehicle industries which offer a large number of gear ratios by utilizing a plurality of serially interconnected planetary gear sets and a plurality of clutches and brakes for effecting the individual gear steps. Some of these transmissions have a two speed front section followed by a multi-speed range section for providing four or more forward speeds and at least one speed in reverse. Exemplifying the art in this area are: U.S. Pat. No. 2,221,393 issued Nov. 12, 1940 to W. L. Carnegie; U.S. Pat. No. 2,978,928 issued Apr. 11, 1961 to R. M. Tuck, et al; U.S. Pat. No. 3,410,157 issued Nov. 12, 1968 to W. G. Livezey; U.S. Pat. No. 3,996,817 issued Dec. 14, 1976 to J. E. Winzeler; U.S. Pat. No. 4,090,415 issued May 23, 1978 to J. M. Gorrell, et al; and U.S. Pat. No. 4,205,563 issued June 3, 1980 to J. M. Gorrell.

One of the disadvantages of these transmissions is that they do not provide enough speeds in the normal tillage range, if the transmission is used in a farm vehicle. Not only are close steps desired in the intermediate speed range, but also a wide speed range or wide overall speed ratio is preferred.

Another problem with those prior transmissions having a dual speed front section or front planetary splitter unit is that their constructions do not favor their use as energy dissipators during power shifting of the gears. For example, many front sections have utilized one interleaved disc type brake assembly for selectively holding the sun gear of a single planetary set stationary and providing a speed other than unity, and one interleaved disc type clutch assembly for selectively coupling the sun gear and the planet carrier together and affording a direct drive speed. But such construction is undesirable because the sun gear operates at relatively high speed, low torque conditions so that the energy levels that must be absorbed by the brake and/or clutch become excessive and require an uneconomical construction. Furthermore, when certain ones of the clutch and/or brakes in the associated range section are engaged, such as in neutral, then the relative speeds of the planet gear elements or sun gear in the front section become so high that their service lives are appreciably reduced.

Another factor is that the construction of a stationary disc type brake assembly does not favor the radial distribution of lubricating fluid therethrough for cooling and energy dissipation purposes to the same degree as a rotating disc type clutch assembly.

Accordingly, what is desired is a simple two-speed front section of a power shift transmission having a disc-type coupling construction which is associated with a relatively high torque member and which will aid in the distribution of cooling fluid therethrough. In this way the cost of construction can be minimized, and yet the compact couplings that are utilized can still absorb the appreciable amounts of energy resulting from a gear shift. Along with this is the need to effectively combine the front section with a rear range section to give a plurality of closely spaced gear speeds in the tillage range, and the need to provide relatively low relative speeds between the interleaved disc and plate members of the various clutches and brakes in the transmission.

The present invention is directed to overcoming one or more of the problems as set forth above.

DISCLOSURE OF THE INVENTION

In one aspect of the invention a planetary transmission includes a front section having a rotating housing and a planetary gear set having a ring gear, a sun gear, and a planet carrier, with the ring gear serving as the input and the rotating housing serving as the output. Advantageously, means are provided for holding the sun gear stationary, first clutch means are provided for connecting the planet carrier to the rotating housing, and second clutch means are provided for connecting the ring gear to the rotating housing.

In another aspect of the invention the aforementioned front section is operatively connected to a rear section having a plurality of planetary sets and a plurality of coupling means to provide a multiplicity of speeds with relatively closely spaced ratios in the intermediate range. Such construction is particularly adaptable to a wheel tractor for agricultural tillage purposes.

Since the sun gear element of the planetary gear set of the front section of the transmission is continually grounded or held stationary, the relative speeds of the elements and the energy dissipation capabilities of the two rotating clutches can be more effectively determined. Furthermore, except when in neutral, whenever the associated engine is operating both the ring gear and the rotating housing will be rotating to effectively aid in the distribution of lubricating and cooling fluid through the clutches of the front section.

BRIEF DESCRIPTION OF THE DRAWINGS

FIG. 1 is a diagrammatic, side elevational view of one embodiment of the planetary transmission of the present invention and showing the planetary elements on only one side of the rotational axis for simplicity.

FIG. 2 is a chart showing the various clutches and brakes which must be engaged to obtain the ten forward and one reverse speeds of the transmission illustrated in FIG. 1, along with the total speed ratio reduction for each speed and the step ratios between each speed.

FIG. 3 is a graph illustrating the transmission input horsepower as a percentage of the maximum versus the transmission output speed as a percentage of the maximum for the transmission illustrated in FIG. 1.

BEST MODE FOR CARRYING OUT THE INVENTION

Figure 4:
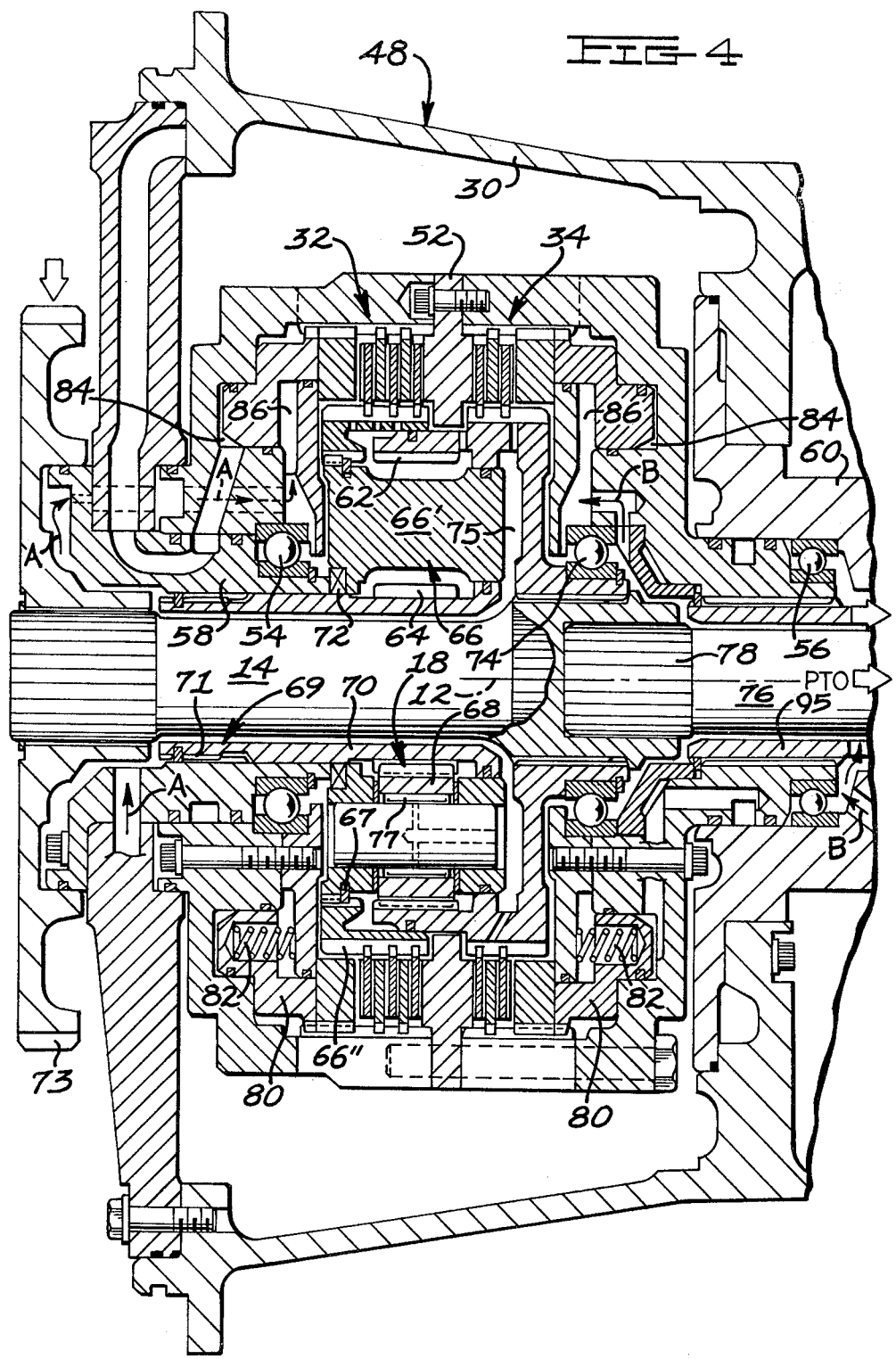
FIG. 4 is a diagrammatic, side elevational sectionalized view of the front section of the planetary transmission shown in FIG. 1, and illustrating portions thereof in greater detail.

Referring to FIG. 1, a vehicle planetary transmission 10 is schematically illustrated on one side of a rotational axis 12 which includes an engine-driven input shaft 14 and a tubular output shaft 16 connected to a conventional mechanism, not shown, for powerably rotating the ground-engaging members of the vehicle. Six interconnected planetary gear sets or epicyclic gear trains 18,20,22,24,26 and 28 are rotatably supported concentrically along the axis within a surrounding and generally tubular transmission housing 30. Three clutch means or disc type clutch assemblies 32,34 and 36 and five brake means or disc type brake assemblies 38,40,42,44 and 46 are serially arranged along the length of the transmission for cooperating with and selectively coupling certain elements of the planetary gear sets and providing ten forward speeds and one reverse speed as is generally indicated by the speed chart of FIG. 2.

The planetary transmission 10 has a front section or splitter speed unit 48 of particularly advantageous construction, and a rear section or range unit 50 associated therewith. The front section includes the first planetary gear set 18 and the first and second clutch means 32,34, and basically serves to provide an underdrive mode and a direct drive mode of operation. The rear section includes the remaining planetary gear sets 20,22,24,26 and 28, the third clutch means 36, and the five brake means 38,40,42,44 and 46 and provides a plurality of speed reduction ratios as well as at least one reverse speed.

As is best shown in FIG. 4, the front section 48 includes a rotating housing 52 which is supported by a pair of axially spaced ball bearing assemblies 54,56 indirectly to the transmission housing 30 through intermediate stationary members of flanged sleeves 58 and 60 respectively. The first planetary gear set 18 has first ring gear, sun gear and planet carrier elements 62,64 and 66 of the type wherein a plurality of similar planet gear elements 68 are rotatably mounted on the carrier element and are in intermeshing engagement with the teeth on the ring and sun gear elements. The carrier element 66 is made up of a central body part 66' and a generally encircling externally toothed ring 66" releasably connected thereto by a spline and retaining ring lock 67. Such construction permits more convenient machining of the elements 66',66" while also contributing to compactness and the accommodation thereof to alignment with the associated elements of the front section.

Advantageously, holding means 69 are provided for continually holding the sun gear element 64 stationary as a reaction member. In the instant example this means includes a tubular extension 70 integral with the sun gear element which is releasably connected to the stationary member 58 by a spline 71 for assembly and disassembly purposes. Thus both the sun gear 64 and the planet carrier element 66 have a preselected degree of floatability or self-alignment capability. The carrier element 66 is at least in part located axially by a thrust bearing assembly 72 encircling the tubular extension 70 and contacting the end of the stationary member 58. An engine-driven input gear 73 is splined to the front end of the input shaft 14, and the ring gear element 62 is splined to the rear end of the input shaft. A third ball bearing assembly 74 rotatably supports the ring gear element in the rotating housing 52, and thus indirectly supports the input shaft. A radially inwardly open annular chamber 75 is defined between the carrier body part 66' and the ring gear element 62, and lubricating fluid directed to this chamber tends to urge the carrier element to the left when viewing the drawing against the thrust bearing assembly solely by the action of the centrifugal head. Fluid in this chamber is also directed to the planet gear bearings 77 and to the clutch means 32,34 for cooling purposes.

The planetary transmission 10 desirably includes an elongate power take off (PTO) shaft 76 which can be releasably connected to the input shaft 14 by splines 78. The engine driven PTO shaft can extend along the rotational axis 12 and out the rear portion of the transmission for driving auxiliary equipment and for convenient removal.

First clutch means 32, when engaged, directly couples the first planet carrier element 66 to the rotating housing 52. Alternatively, but in a similar manner, second clutch means 34 directly couples the first ring gear element 62 to the rotating housing. In the embodiment illustrated each of these clutch means includes a hydraulically engaged annular actuating piston 80 which is retracted by a plurality of compression springs 82. Pressurized fluid can be selectively delivered to the respective actuating chamber 84 defined between the rotating housing and piston on one side thereof, and counterbalancing fluid under basically only centrifugal pressure is supplied to a balancing chamber 86 on the opposite side thereof to promote more rapid disengagement of the piston upon release of pressure to the actuating chamber. In general, lubricating fluid is directed to the left balance chamber 86 when viewing FIG. 4 along the path designated by the flow arrows identified by the letter A, and to the right balance chamber 86 along the path illustrated by the flow arrows identified by the letter B.

The third clutch means 36 shown in FIG. 1 only schematically is of similar construction to the clutch means 32,34 illustrated in FIG. 4, and the five brake means 38,40,42,44 and 46 are preferably hydraulically engaged and spring engaged also. It is to be appreciated that while the remaining clutch means and brake means are not illustrated in detail, they are preferably of the disc type having a plurality of interleaved discs and plates which are axially slideable toward engagement by the respective actuating pistons as is known to those skilled in the power shift transmission art.

Referring now to FIG. 1 and the construction of the rear section 50, the second planetary set 20 can be noted to include second ring gear, sun gear and planet carrier elements 88,90 and 92 and a plurality of similar planet gear elements 94. The second sun element 90 is connected to an elongate, tubular intermediate shaft 95 for joint rotation with the rotating housing 52 forming the output of the front section 48, as is an annular plate member 96. The third clutch means 36, when engaged, directly couples the annular plate member and planet carrier element together.

The third planetary set 22 includes third ring gear, sun gear and planet carrier elements 98,100 and 102 and a plurality of planet gear elements 104. As is schematically illustrated in FIG. 1, the third ring element 98 is connected for joint rotation with the section carrier element 92. Also, the third sun gear 100 is connected for joint rotation with the intermediate shaft 95.

The fourth planetary gear set 24 includes fourth ring gear, sun gear and planet carrier elements 106,108 and 110 and a plurality of planet gear elements 112. The fourth planet carrier 110 is preferably integrally connected to the third planet carrier 102 and is directly releasably connected to the output shaft 16 through splines or the like, not shown. The fourth sun gear 108 is releasably coupled to the intermediate shaft 95 for joint rotation.

Likewise, the fifth planetary gear set 26 has fifth ring gear, sun gear and planet carrier elements 114,116 and 118 and a plurality of planet gear elements 120. An intermediate annular plate 122 effectively connects the fifth sun gear 116 and fourth ring gear 106 for joint rotation.

Lastly, the sixth planetary gear set 28 has sixth ring gear and planet carrier elements 124,126 and 128 and a double or compound set of planet gear elements 130,132, with the planet gears 130 intermeshing with the ring gear 124 and the planet gears 132 intermeshing with the sun gear 126. The adjacent sun gears 116 and 126 are preferably integrally connected to each other, and the adjacent planet carriers 118 and 128 are preferably integrally connected to each other to affect manufacturing economy. The unitized planet carrier 118,128 is releasably and non-rotatably connected to the output shaft 16.

With such construction each of the ring gear elements 88,98,106,114 and 124 is selectively held stationary to provide the desired reaction element by the actuation of the respective first to fifth brake means 38,40,42,44 and 46 respectively.

Industrial Applicability

The planetary transmission 10 has been installed in an agricultural, wheeled vehicle and has been found to be operationally very effective. In the first forward gear the first clutch means 32 is engaged in the front section 48 to provide an underdrive mode of operation at a speed reduction with respect to the input shaft 14 of about 1.4. Simultaneously, the last of fifth brake means 46 is engaged in the rear section 50 to hold the ring gear 124 fixed to the encircling housing 30 and to provide a speed reduction with respect to the intermediate shaft 95 and the input fourth sun gear 108 of about 7.5. Thus, the fourth and sixth planetary sets 24 and 28 cooperate in the rear section along multiple power paths with the planet carrier torques being additive to drive the output shaft 16 in first gear so as to provide a ground speed, for example, of about 3.2 kph (2 mph).

A shift to second gear from first gear is accomplished by disengaging the first clutch means 32 and engaging the second clutch means 34. This results in the direct coupling of the input ring gear 62 to the output rotating housing 52 for a direct drive mode in the front section 48. Reference is made to the speed chart of FIG. 2, wherein it can be noted that the fifth brake means 46 remains engaged.

A shift from second to third gear is achieved by returning to the underdrive mode in the front section 48, and by engaging the third brake means 42 and disengaging the fifth brake means 46. Since the ring rear element 106 is held stationary to the housing 30, the fourth planetary gear set 24 is thereby actuated and a rear section speed reduction of about 3.7 is provided.

Continuing with an upshift to fourth gear, the front section of the transmission continues in the underdrive mode and the rear section is operated so as to engage solely the second brake means 40. This secures the third ring gear 98 to the housing 30 and results in a speed reduction of about 3.1 through the third planetary gear set 22.

In fifth gear the front section of the transmission is returned to a direct drive mode and the rear section is returned to the speed reduction established in third gear. In other words, the third brake means 42 is operated again.

In sixth gear the front section continues in direct drive and the rear section reverts to the speed reduction established in fourth gear.

In seventh gear, the front section reverts to the underdrive mode and the rear section is operated so as to engage the first brake means 38. This results in holding the second ring gear 88 stationary as a reaction member, and causing the second and third planetary gear sets 20,22 to cooperate through multiple or split power flow paths to provide a speed reduction of about 1.9 between the intermediate shaft 95 and the output shaft 16.

In eighth gear the front section reverts to direct drive and the rear section remains as in seventh gear.

In ninth gear the front section is changed to the underdrive mode, and the rear section is placed in a direct drive mode. The direct drive portion is accomplished by the engagement of the third clutch means 36. This couples the intermediate shaft 95, the sun gears 90 and 100, the planet carrier 92 and the ring gear 98 for joint rotation.

In top gear the front section is returned to direct drive and the rear section can remain in direct drive as in ninth gear. This can provide a vehicle ground speed of about 32 kph (20 mph).

Reverse is achieved by placing the front section in the underdrive mode by engagement of clutch means 32 and by engaging the fourth barke means 44 and holding the fifth ring gear 115 stationary. In the rear section the fourth and fifth planetary gear sets 24,26 cooperate to provide a negative speed reduction of about 4.3 through multiple power paths wherein the planet carrier torques are subtracted from one another. A second speed reverse speed is conveniently available, if needed, by engaging the clutch means 34 in the front section.

Looking now at the graph of FIG. 3, and the step ratios noted between the gear speeds as is illustrated in the last column of FIG. 2, it is to be appreciated that the third through seventh gear speeds are tightly grouped. This is advantageous in that if the transmission 10 is used on a wheeled farm or agricultural tractor then the speed of the vehicle can be precisely matched to the tillage or plowing requirements most often utilized in the 5.6 kph (3.5 mph) through 12.9 kph (8 mph) speed range, for example. This results in greater economy of operation. Moreover, a wide overall speed ratio is also provided.

By incorporating an output rotating housing 52 and associated pair of clutches 32 and 34 in the front splitter speed unit 48, along with a continually fixed first sun gear 64, the energy dissipation associated with each gear shift can be effectively taken in the front section of the transmission without the speeds of the various elements of the first planetary gear set 18 becoming excessive.

In neutral, the third clutch means 36 is preferably engaged and the first and second clutch means 32,34 disengaged. Hence the input shaft 14 is disconnected from the rotating housing output of the front section. This is advantageous in the event the vehicle is parked for a considerable period of time the rotating housing 52 is stationary while the input shaft is being driven by the engine of the vehicle for powering auxiliary equipment, not shown, by way of the PTO shaft 76. In such mode of operation torque on the first sun gear 64 is substantially zero and the relative speeds of the elements of the first planetary gear set 18 are low enough that the transmission can be operated indefinitely without effecting the service life. In contrast, prior art splitter units have released the sun gear to freewheel along with the planet gears at undesirably high speeds under these circumstances.

Another feature of the front speed unit 48 is that it provides effective PTO shaft operation along the central axis without more than two concentric shafts. This simplifies the construction and aids in compactness of the speed unit.

Still further, note that the rotating housing 52 in the front section is normally rotating so that the distribution of lubricating and cooling fluid therethrough is encouraged through centrifugal action.

Other aspects, objects and advantages of this invention can be obtained from a study of the drawings, the disclosure and the appended claims.

I claim:

1. A planetary transmission (10) comprising:
    a front section (48) having a rotating housing (52) and a planetary gear set (18) including a ring gear (62), a sun gear (64) and a planet carrier (66), the ring gear (62) serving as the input and the rotating housing (52) serving as the output;
    holding means (69) for holding the sun gear (64) stationary;
    first clutch means (32) for selectively connecting the planet carrier (66) to the rotating housing (52) and providing underdrive; and
    second clutch means (34) for selectively connecting the ring gear (62) to the rotating housing (52) and providing direct drive.

2. The planetary transmission (10) of claim 1 including an encircling housing (30), and wherein the holding means (69) includes a stationary member (58) connected between the sun gear (64) and the encircling housing (30).

3. The planetary transmission (10) of claim 2 including a tubular extension (70) connected to the sun gear (64), the tubular extension (70) being releasably connected to the stationary member (58).

4. The planetary transmission (10) of claim 3 including a central axis (12) and an input shaft (14) disposed on the axis (12), the input shaft (14) extending through the tubular extension (70).

5. The planetary transmission (10) of claim 4 including a PTO shaft (76) releasably connected to the input shaft (14) and disposed on the axis (12).

6. The planetary transmission (10) of claim 1 including a stationary member (58) and wherein the holding means (69) has means (70,71) for continually and splinably connecting the sun gear (64) to the stationary member (58).

7. The planetary transmission (10) of claim 1 including a rear section (50) having a plurality of planetary gear sets (20,22,24,26 and 28) and a tubular shaft (95) connected to the rotating housing (52) and providing the input to the rear section (50).

8. The planetary transmission (10) of claim 7 including an input shaft (14) connected to the ring gear (62) and a PTO shaft (76) releasably connected to the input shaft (14) and extending rearwardly through the tubular shaft (95).

9. The planetary transmission (10) of claim 1 including rear section means (50) including a plurality of interconnected planetary gear sets (20,22,24,26,28) and operatively connected to the front section (48) for providing a plurality of forward speeds and at least one reverse speed.

10. The planetary transmission (10) of claim 9 incorporated in a wheeled agricultural tractor.

11. The planetary transmission (10) of claim 1 including an axially spaced apart pair of bearing assemblies (54,56) and stationary housing means (30,58,60) for supporting the bearing assemblies (54,56), the bearing assembles (54,56) being of a construction sufficient for rotatably supporting the rotating housing (52).

12. The planetary transmission (10) of claim 11 including another bearing assembly (74) connected between the rotating housing (52) and the ring gear (62).

13. The planetary transmission (10) of claim 1 wherein the first and second clutch means (32,34) each have a hydraulically engaged and spring disengaged annular piston (80,80) located within the rotating housing (52).

14. The planetary tranmission (10) of claim 13 including balancing chamber means (86) defined between each piston (80) and the rotating housing (52) for holding fluid under centrifugal pressure and biasing the pistons (80) toward disengagement.

15. The planetary transmission (10) of claim 1 including a stationary member (58) and a thrust bearing assembly (72) in abutment therewith, the planet carrier (66) being in engagement against the bearing assembly (72).

16. The planetary transmission (10) of claim 15 including annular chamber means (75) for biasing the planet carrier (66) toward the thrust bearing assembly (72).

17. The transmission (10) of claim 1 including a radially inwardly open annular chamber (75) defined between the ring gear (62) and the planet carrier (66) of a construction sufficient for containing a fluid solely under centrifugal pressure.

18. The planetary transmission (10) of claim 1 wherein the planet carrier (66) includes a body part (66') and a toothed ring (66") splinably and releasably connected to the body part (66').

* * * * *